June 9, 1959 G. C. ELLERBECK 2,889,985

PROPORTIONAL GEAR CALCULATING MACHINE

Filed Sept. 7, 1954 5 Sheets-Sheet 1

PROPORTIONAL GEAR CALCULATING MACHINE

Filed Sept. 7, 1954

5 Sheets-Sheet 2

June 9, 1959 G. C. ELLERBECK 2,889,985

PROPORTIONAL GEAR CALCULATING MACHINE

Filed Sept. 7, 1954 5 Sheets-Sheet 3

PROPORTIONAL GEAR CALCULATING MACHINE

Filed Sept. 7, 1954 5 Sheets-Sheet 4

June 9, 1959 G. C. ELLERBECK 2,889,985

PROPORTIONAL GEAR CALCULATING MACHINE

Filed Sept. 7, 1954 5 Sheets-Sheet 5

United States Patent Office 2,889,985

Patented June 9, 1959

2,889,985

PROPORTIONAL GEAR CALCULATING MACHINE

Grant C. Ellerbeck, San Leandro, Calif., assignor to Friden, Inc., a corporation of California Application September 7, 1954, Serial No. 454,381

11 Claims. (Cl. 235—73)

This invention relates to calculating machines and has particular reference to a calculating machine having proportional gear digitation mechanism.

It is among the objects of the invention to provide a calculating machine having a keyboard and a register and proportional gear digitation mechanism conditioned by the keyboard and effective to enter keyboard selected values directly into the register; which mechanism is effective to accomplish tens-transfers in the register at the same time that a value is being entered in the register; which is effective to enter values either additively or subtractively into the register; which is power driven so that the keyboard keys are used only to couple and uncouple the gear trains of the proportional gear mechanism and have a light touch as they do not drive any part of the mechanism; which is effective to fully complete any entry operation in a single-rotation operating cycle of the machine; which positively maintains the drive for each register dial in a locked condition except when an entry or a tens-transfer is being made in the particular register dial; which is rapid, positive, accurate and quiet in operation; and which provides unidirectional rotation of the mechanism for all digitation operations.

Other objects and advantages will become apparent from a consideration of the following description and the appended claims in conjunction with the accompanying drawings wherein:

With continued reference to the drawings, the frame of the calculating machine, fragmentarily illustrated, is generally indicated at A, the keyboard of the machine is generally indicated at B, the register at C and the proportional gear digitation mechanism at D.

The fixed frame A of the machine may be of any suitable or desired construction and the portion of the frame illustrated includes front and rear transverse frame members 10 and 11 and intermediate transverse frame members 12, 13 and 14, all of the transverse frame members being substantially vertically disposed or substantially perpendicular to the machine base and disposed in spaced-apart and parallel relationship to each other.

Figure 7:
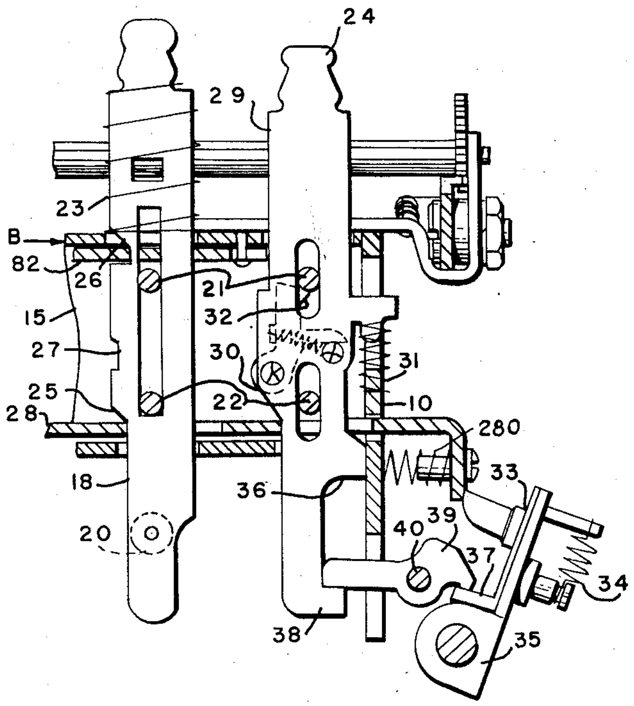
Fig. 7 is a fragmentary cross-sectional view on an enlarged scale on a plane coincident with, or parallel to, the section plane of Fig. 1, showing a portion of the mechanism for automatically releasing the keyboard keys.

The keyboard B (Figs. 1 and 7) comprises a flat keyboard frame 15 of rectangular shape, and a plurality of keys, generally indicated at 16, slidably mounted in the frame 15. Each key comprises a flat, elongated stem 18 extending slidably through mutually registering apertures in the top and bottom walls of the keyboard frame 15; a head, or top, 19 on the upper end of each key stem; and a conical operating pin 20 extending perpendicularly from the lower end portion of each key stem and preferably carrying an operating sleeve or roller journalled thereon. In the arrangement illustrated, each key stem is longitudinally slotted intermediate its length. Tie rods, as indicated at 21 and 22, extend in pairs transversely of the keyboard and through the slots in the corresponding key stems, the rod 21 of each pair being disposed directly above the rod 22 of the same pair of tie rods. A compression spring 23 surrounds each key stem between the top wall of the keyboard frame 15 and the bottom end of the corresponding key top 19 to resiliently urge the keys to their upper, or raised, positions.

The keyboard keys are arranged in ordinal rows, or orders, extending longitudinally of the keyboard and the machine, to constitute a full keyboard arrangement. Ordinarily there are eight or ten ordinally arranged rows of keys, with the digit keys in each row progressing from "1" to "9" in transverse banks from the front to the rear end of the keyboard. Each key stem is provided at its rear edge with upwardly and rearwardly inclined shoulders 25 and 26 disposed adjacent the bottom and top walls, respectively, of the keyboard frame. The upper shoulder 26 leads into a notch in the key stem, which notch has a bottom edge substantially perpendicular to the longitudinal center line of the stem. A notch 27 of rectangular shape is provided on each key stem between the lower and upper shoulders 25 and 26.

An ordinal key latch bar 28 extends along each row of keyboard keys, on the upper surface of the bottom wall of the keyboard frame, each latch bar being provided with a series of slots spaced apart longitudinally thereof through which the stems 18 of the corresponding keys extend. The latch bars are all resiliently urged in a forward direction, as by springs 280 shown in Fig. 7. Whenever a key in the corresponding key row is depressed, the latch bar is first moved rearwardly by the lower shoulder 25 of the key stem and is subsequently moved forwardly by the spring bias urging it in a forward direction, to engage in the notch 27 of the corresponding key stem and releasably hold the depressed key in latch-down condition.

A "0" key 24 is slidably mounted in the keyboard frame 15 at the front end of each ordinal row of digit keys 16, each "0" key having a flat stem 29 (Fig. 7) extending slidably through mutually registering apertures in the upper and lower walls of the keyboard frame 15. The stem 29 is provided in its rearward edge with an upwardly and rearwardly directed shoulder 30 which is effective to shift the corresponding latch-down bar 28 rearwardly to release any depressed digit key in the same row when the "0" key is depressed. However, the "0" key is not provided with a notch corresponding to the notch 27 in each digit key stem so that the "0" key is not latched down. The "0" key is resiliently urged to its raised position by a spring 31 and is stopped in its raised position by a releasable stop 32 which can be overridden so that the "0" key can be raised above its normal raised position for retaining a digit key in the corresponding key row depressed from cycle to cycle of the machine.

A digit key releasing bail 35 extends along the front side of the keyboard frame in spaced relationship thereto, and is rocked toward the front end of the keyboard whenever the cyclic clutch, later to be described in detail, operates to terminate an operating cycle of the machine. The bail 35 carries, at locations spaced apart therealong, interponent elements 33 which are slidably mounted on the bail for limited vertical movement transversely of the bail, the individual elements being resiliently urged to their upper limiting positions by individual springs 34. When any interponent element 33 is in its upper position, it engages the front end of the corresponding key latching bar 28 and forces the bar rearwardly to release any latched-down digit key in the corresponding key row when the bail 35 is rocked toward the front side of the keyboard frame, as described above.

Each interponent element is provided with a rearwardly projecting abutment formation 37 and each "0" key stem is provided at its bottom end with a forwardly directed abutment formation 38. A series of levers 39 are pivotally mounted intermediate their lengths on a rod 40 which is disposed between the front side of the keyboard frame and the bail 35 and parallel to the bail. Each lever 39 bears at its front end on the abutment formation 37 of the corresponding interponent element 33 and at its rear end on the abutment formation 38 on the "0" key stem of the same order, and is effective, when the "0" key is raised above its normal raised position, to move the associated interponent element 33 downwardly so that it will miss the corresponding latch bar 28 when the bail 35 is rocked and a latched-down key in the corresponding key row will not be released.

Each "0" key stem is also provided with a forwardly directed projection 36 which is moved into the "0" key stem receiving slot in the corresponding latch-down bar 28 when the "0" key is raised above its normal "up," or raised, position, and positively locks the associated latch-down bar against a rearwardly directed, key-releasing movement. When it is desired to restore a latch-down bar 28 to automatic operation by the bail 35 after the corresponding "0" key has been raised, the "0" key is manually pressed down to its normal "up" position as determined by the releasable stop 32.

The above-described keyboard construction is well known to the art, being substantially disclosed in Patent No. 2,229,889, issued January 28, 1941, to Carl M. F. Friden for "Calculating Machine."

Figures 1, 4:
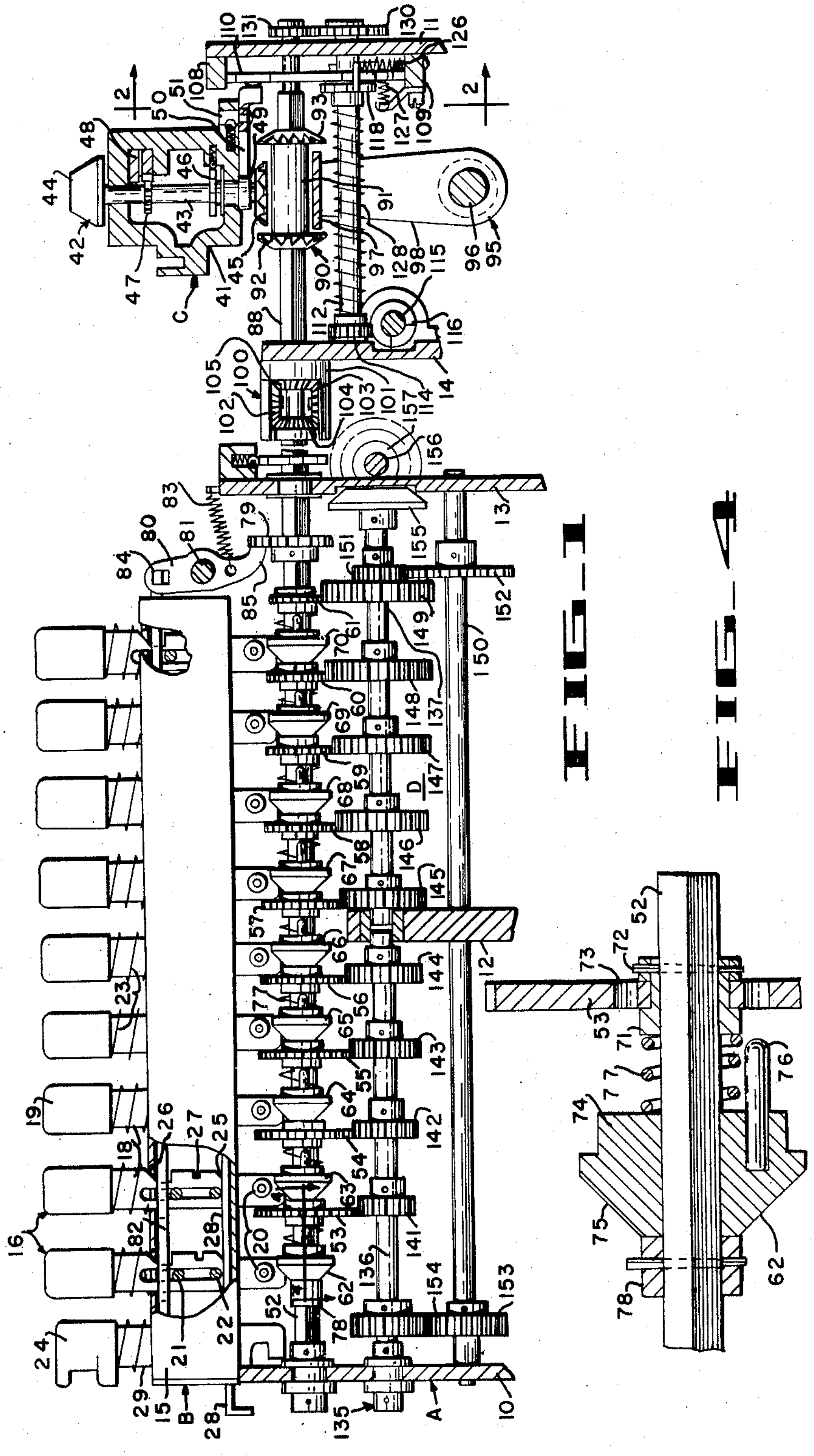
Fig. 1 is a longitudinal cross-sectional view through the digitation mechanism of a calculating machine illustrative of the invention.
Fig. 4 is a fragmentary cross-sectional view on an enlarged scale on the line 4—4 of Fig. 1.

The register C, as shown in Fig. 1, is mounted in an elongated frame 41 which, as illustrated, is hollow and of rectangular cross-sectional shape. This frame 41 is disposed above, and extends transversely of, the machine frame A, rearwardly of the keyboard B. The frame may be fixed to the machine frame, but ordinarily would be transversely shiftable relative to the machine frame to constitute a movable register carriage, as disclosed in the patent just mentioned.

A plurality of dial assemblies, generally indicated at 42, are spaced apart along the frame 41 in ordinal arrangement. Each comprises a dial shaft 43 extending through, and journalled in, the frame 41 in a substantially vertical position; a numbered dial 44 secured on the upper end of the shaft 43, above the frame 41; and a bevel gear 45 secured on the lower end of the shaft 43, below the frame 41. A detent plate, or star wheel, 46 is provided on each shaft 43 within the hollow frame 41 to definitely position the dial assembly at different digital positions of rotation. A mutilated resetting gear 47 is provided on each shaft 43 within the frame 41, which gears are engaged by the clearing, or resetting, rack 48 extending longitudinally of the interior of the register frame, to zeroize the register.

A tens-transfer cam 49 is provided on each shaft 43 between the bevel gear 45 and the bottom surface of the register frame 41. Tens-transfer bellcrank levers 50 are disposed against the undersurface of the register frame 41 rearwardly of the shafts 43, each being pivotally mounted on the register frame by a pivot pin 51 projecting upwardly from the upper side thereof and received in the corresponding apertures provided in the frame 41. Each tens-transfer lever 50 is engaged near its forward end by the corresponding tens-transfer cam 49, so that the lever 50 is rocked about the axis of its pivot pin 51 when the corresponding dial assembly passes through its "9" to "0" position in either direction, in a manner well known to the art and disclosed in the Friden Patent No. 2,229,889, referred to above, to effect a tens-transfer from a lower order dial assembly to the dial assembly of the next higher order.

Figure 3:
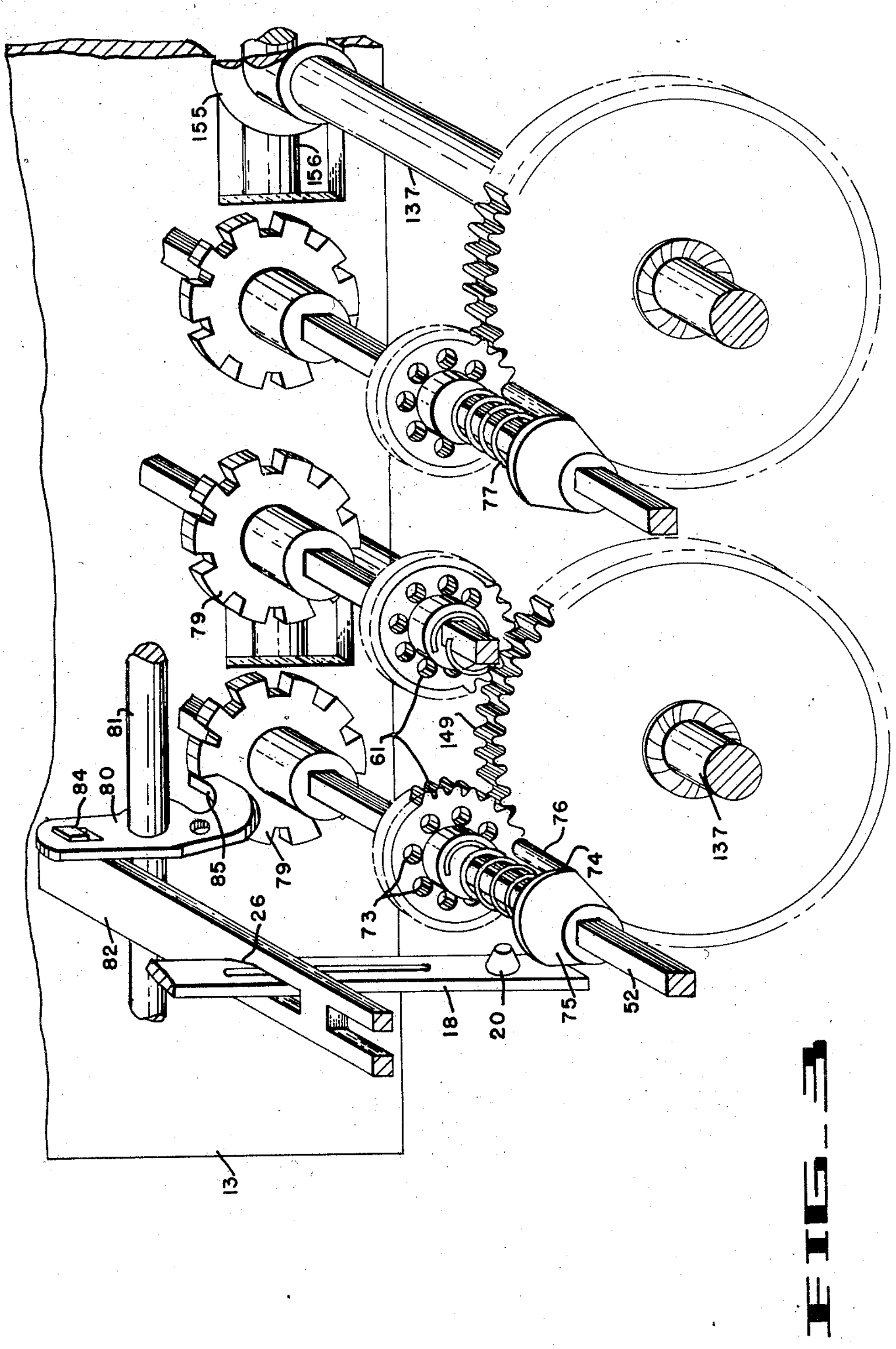
Fig. 3 is a fragmentary perspective view of the combined selection and actuation mechanism of the machine.

The proportional gear digitation mechanism D comprises a plurality of square shafts 52 disposed below, and extending longitudinally of, the keyboard frame 15, as shown in Figs. 1 and 3, and journalled at their front ends in the front transverse frame member 10 and at their rear ends in the intermediate transverse frame member 13. The square shafts 52 are disposed one below each row, or order, of digit keys 16 and are arranged in spaced-apart and parallel relationship to each other with their center lines substantially in a common plane which is parallel to the plane of the bottom surface of the keyboard frame 15. Nine spur gears, as indicated at 53 to 61, inclusive, are rotatably mounted on each square shaft 52 at locations spaced apart along the corresponding square shaft, as shown in enlarged detail in Fig. 4. These gears are disposed between the lower end portions of adjacent digit key stems 18 and decrease in diameter from the front gear 53 corresponding to the "1" key of the corresponding row of digit keys to the rear gear 61 corresponding to the "9" key of the corresponding key row. Clutches, as indicated at 62 to 70, inclusive, are slidably and nonrotatably mounted on each square shaft 52 at locations spaced apart along the square shaft, each clutch having a permanent driving connection with the associated square shaft and the series of clutches 62 to 70 on each square shaft being respectively disposed immediately forwardly of the corresponding gears 53 to 61 of the series of gears on the same shaft.

As is illustrated in somewhat greater detail in Fig. 4, each of the gears 53 to 61, inclusive, is journalled on a two-part sleeve 71 mounted on the square shaft 52 and secured in assembled condition and in proper location on the square shaft by a through pin 72 extending through the sleeve and the square shaft. Each of the gears is provided with a circular series of apertures 73 extending around the sleeve, or hub, 71 and spaced apart at equal angular intervals, there being ten such apertures in each gear. Each of the clutches 62 to 70, inclusive, comprises a collar 74 slidably mounted on the square shaft 52 against rotation relative thereto. Each collar has a rear portion of cylindrical shape and a front portion of conical shape providing a truncated conical cam surface 75 opposed to the corresponding key stem carried pin, or roller, 20. A pin 76 projects from the rear side of each clutch collar 74 substantially parallel to the axis of the corresponding shaft 52 and is engageable at its rear end in any one of the apertures 73 aligned therewith in the corresponding gear when the clutch collar is moved rearwardly along the square shaft toward the associated gear.

Compression springs 77, each surrounding the shaft 52 between the front end of each gear hub 71 on such shaft and the rear end of the adjacent clutch collar, or sleeve 74, resiliently urge the clutch collars forwardly and the clutch pins 76 out of engagement with the apertures 73 of the associated gears. The key stem carried pins 20, by engagement with the conical cam surfaces 75 of the corresponding clutch sleeves when the corresponding keys are depressed, force the clutch sleeves rearwardly to engage the clutch pins 76 in the aligned apertures 73 of the corresponding gears 53 to 61, inclusive. Thus, when a digit key of the keyboard is depressed, the corresponding clutch collar is forced rearwardly to provide a driving connection between the corresponding gear and the square shaft 52 on which the gear is mounted.

The spring-induced movement of each clutch spool is terminated by engagement of the front end of the spool with the rear end of the gear-supporting sleeve 71 immediately in front of the clutch spool, except the first, or front, clutch spool 62 which engages the rear end of a stop collar 78 fixed on the square shaft 52 in front of the spool of the clutch 62.

A notched wheel 79 is secured on each square shaft 52 between the rearmost gear 61 and the intermediate frame member 13 in which the square shafts are journalled near their rear ends. Latch dogs 80 are pivotally mounted intermediate their lengths on a rod 81 extending along, and disposed rearwardly of, the rear side or end of the keyboard frame 15 and are effective to engage the corresponding notched wheels and positively hold the square shafts 52 against rotational movement except when a coordinal value key has been depressed to enter a selected value into the keyboard for entry into the register C of the machine.

A latch releasing slide, or bar, 82 extends along each row of digit keys 16, adjacent the undersurface of the top wall of the keyboard frame 15. Each of these slide bars is provided with a series of slots spaced apart longitudinally thereof, through which slots the corresponding digit key stems 18 extend. Tension springs 83 connected between each locking dog 80 below the pivot rod 81 and the top edge of the intermediate frame member 13, resiliently rock the dogs 80 in a direction to urge the corresponding slide bars 82 forwardly, each slide bar being pivotally connected at its rear end to the upper end of a corresponding locking dog 80, as indicated at 84.

When all of the keys in a key row are in their raised positions, the rear ends of the key stem receiving slots in the corresponding slide bar 82 are in register with the upper notches in the rear edges of the key stems. In that event, the corresponding spring 83 rocks the associated locking dog 80, so that the detent formation 85 on the lower end of each dog 80 is engaged in a peripheral notch in the corresponding notched wheel 79, and the square shaft 52 corresponding to the particular key row is positively held against rotational movement. When a key is depressed, the upper shoulder 26 (Figs. 1 and 7) in the stem of the depressed key engages the corresponding slide bar 82 and forces the bar rearwardly to withdraw the detent formation 85 of the corresponding dog 80 from the associated notched wheel 79, and thereby frees the corresponding square shaft 52 for rotation. However, simultaneously with release of the notched wheel 79, the shaft 52 is locked against unwanted rotation for the depressed key has shifted its clutch member 62 to 70 into clutching engagement with its associated gear 53 to 61.

Square extension shafts 88 are disposed rearwardly of, and in axial alignment with, the square shafts 52. These extension shafts are disposed, one under each of the dial shafts 43, and are journalled near their front and rear ends in the intermediate transverse frame member 14 and the rear transverse frame member 11, respectively. A double gear unit, or digitation spool, generally indicated at 90, is slidably mounted on each square extension shaft 88 and includes an intermediate sleeve portion 91 disposed directly below the corresponding bevel gear 45, and bevel gears 92 and 93 disposed, one at each end of the sleeve 91, and alternatively meshable with the bevel gear 45 on the bottom end of the corresponding dial shaft 43 to provide a reversible driving connection between the extension shaft 88 and the dial shaft 43.

A digitation control, or "plus-minus," gate, generally indicated at 95, is disposed below the row of gear sleeves 91. The gate comprises a rock shaft 96 and a flat cross-member, or strap, 97 disposed immediately below, and extending transversely of, the sleeve portions 91 and between the front and rear gears 92 and 93 of the several gear spools 90, the strap being held in spaced-apart and parallel relationship to the rock shaft 96 by arms, one of which is indicated at 98, extending downwardly, one from each end of the strap 97 and secured to the rock shaft 96.

The additive and subtractive entry control keys of the machine are connected to the rock shaft 96 in a manner well known to the art, so that when the addition key is depressed, the bail 95 is rocked in a direction to mesh the front gears 92 of the gear spools 90 with the dial shaft gears 45 to effect a positive, or additive, entry into the register and, when the subtraction control key is depressed, the bail is rocked in a direction to mesh the rear gears 93 with the dial shaft gears 45 to effect a negative, or subtractive, entry into the register.

Figure 5:
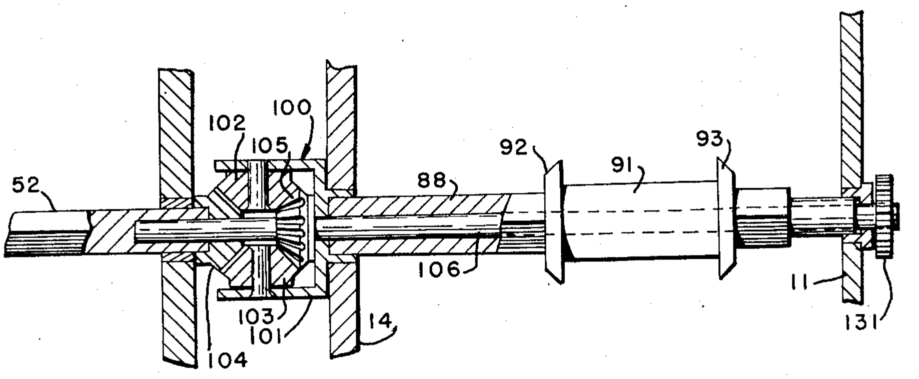
Fig. 5 is a fragmentary cross-sectional view on an enlarged scale on the line 5—5 of Fig. 2.

Differential units, as generally indicated at 100, and illustrated in Figs. 1 and 5, operatively connect each square shaft 52 to its corresponding extension shaft 88. Each of these units comprises a cage 101 secured to the front end of the corresponding extension shaft 88 at the front side of the intermediate transverse frame member 14 and journalled at one end in the frame member 14. Each cage carries angularly spaced-apart spider gears 102 and 103. A bevel gear 104 is secured on each square shaft 52 at the rear end thereof and meshes with the beveled spider gears 102 and 103 of the corresponding differential unit. A second bevel gear 105 disposed opposite the gear 104 also meshes with the spider gears.

Each extension shaft 88 is made tubular to provide a quill shaft, as shown in Fig. 5. A core shaft 106 extends through each tubular extension shaft 88, through the corresponding differential unit cage 101 and into a coaxial well, or recess in the rear end of the corresponding square shaft 52, the bevel gear 105 of each differential unit being secured on the corresponding core shaft 106.

The differential units 100 are part of the tens-transfer mechanism of the machine as are the core shafts 106, and the tens-transfer mechanism includes additional components, as will now be described.

Figure 2:
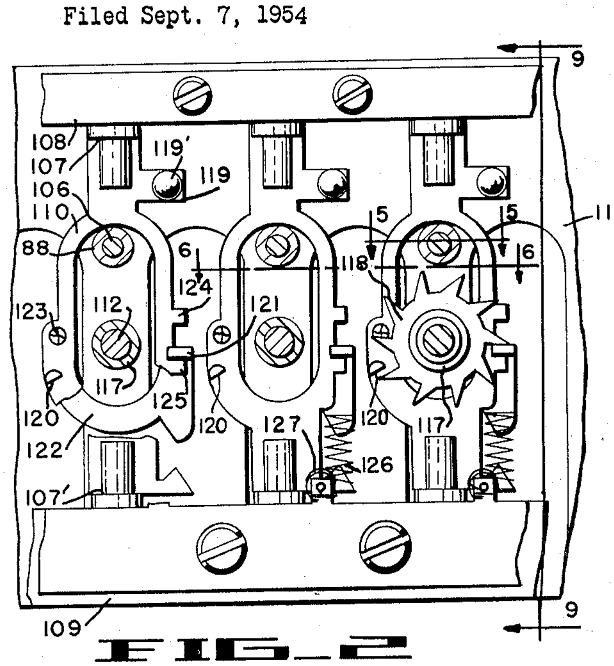
Fig. 2 is a fragmentary cross-sectional view on an enlarged scale on the line 2—2 of Fig. 1.
Figure 9:
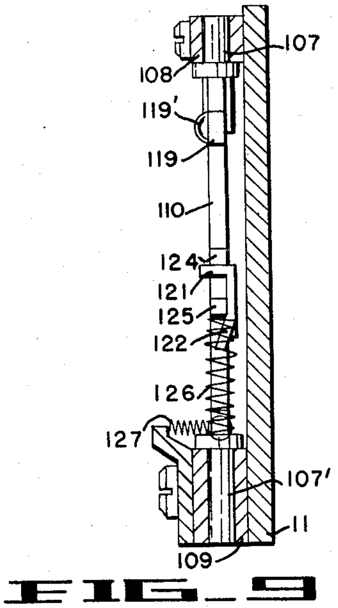
Fig. 9 is a fragmentary cross-sectional view on the line 9—9 of Fig. 2.
Figure 8:
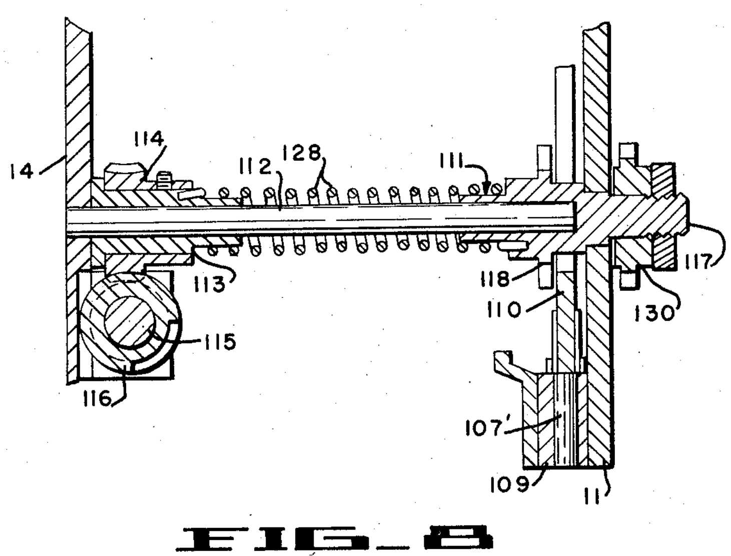
Fig. 8 is a cross-sectional view on the line 8—8 of Fig. 6.
Figure 6:
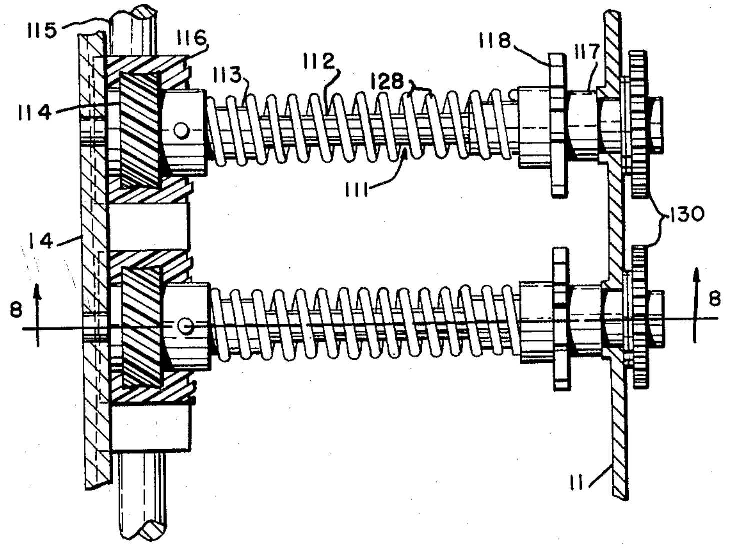
Fig. 6 is a fragmentary cross-sectional view on the line 6—6 of Fig. 2.

The rear transverse frame member 11 (Figs. 1, 2, 8 and 9) is provided wtih flanges, or ledges, 108 and 109 extending longitudinally thereof in spaced-apart and parallel relationship to each other, one above and one below the shaft extensions 88. A plurality of escapement pawls 110, substantially in the shape of hollow, rectangular frames, are disposed between the frame flanges 108 and 109 with their upper ends pivotally connected to the upper flange 108, as indicated at 107, and their lower ends pivotally connected to the lower flange 109, as indicated at 107'. Each of the square extension shafts 88 extends through a corresponding escapement pawl 110, as is shown in Fig. 2. A tens-transfer drive mechanism 111 (Figs. 6 and 8) is provided for, and is disposed below and axially parallel to, each extension shaft 88. Each drive mechanism includes a shaft 112 fixed at its front end in the frame member 14 and extending rearwardly therefrom. A sleeve 113 is journalled on each shaft 112 near the frame member 14 and a worm gear 114 is coaxially mounted on each sleeve and has a frictional driving connection therewith. A worm shaft 115 extends along the rearward side of the intermediate frame member 14 immediately below the worm gears 114 and is driven by the power-operated mechanism of the calculating machine whenever the machine is in operation. This shaft 115 carries a series of worms 116 which mesh respectively with the worm gears 114 to drive these gears and apply a frictional driving torque to the corresponding sleeves 113. A stub shaft 117 is disposed at the rear end of each shaft 112, each stub shaft being journalled in an aperture in frame member 11 and having a coaxial blind bore receiving the rear end portion of the corresponding shaft 112. Each stub shaft 117 extends through the corresponding escapement pawl 110. A ratchet wheel 118 is formed on each stub shaft 117 at the front side of the corresponding ratchet pawl 110. A torsion spring 128, secured at one end to the corresponding sleeve 113 and at its opposite end to the corresponding stub shaft 117, surounds each shaft 112 and continuously biases the corresponding ratchet wheel to turn in a direction to accomplish a tens-transfer.

Each escapement pawl 110 (Figs. 1, 2 and 9) carries near its upper end an arm 119 which projects to the right of the pivotal axis of the corresponding pawl and carries near its right-hand end a forwardly directed protrusion 119'. The tens-transfer bellcrank levers 50 and the arms 119 on the ratchet wheel pawls 110 are so arranged that when a dial assembly in a particular order passes through its "9" to "0" or "0" to "9" position in accumulating values, the ratchet pawl associated with the next higher order will be rocked about the axis of its pivotal connections with the flanges 108 and 109 of the rear transverse frame member 11.

Each escapement pawl 110 carries two stops, or detents, 120 and 121 at respectively opposite sides of the corresponding ratchet wheel 118. The stop pin 120 is fixed on the pawl while the stop shoulder 121 is carried on an arm 122 pivoted at one end to the pawl at 123. This shoulder, or stop, 121 is movable between spaced-apart stops 124 and 125 on the adjacent side of the pawl, and is urged against the upper stop 124 by a spring 126. When the pawl 110 is in its unrocked, or normal inactive, position, to which it is urged by a spring 127, a tooth of the corresponding ratchet wheel 118 rests on the detent 121. It will be recalled that the ratchet wheel is biased, in a clockwise direction in Fig. 2, by the torsion spring 128, which is stronger than spring 126. Thus, rotation of ratchet wheel 118 forces the detent 121 down against the lower stop 125, and compresses spring 126. At this point the ratchet wheel tooth nearest the stop pin 120 is short of the pin, so that if the ratchet wheel were released from shoulder 121 it would be free to rotate through a small angle before it would be stopped by pin 120.

When an escapement pawl 110 is rocked by action of a tens-transfer lever against its arm 119, the detent 121 is withdrawn from the ratchet wheel tooth with which it is engaged and the spring 126 immediately expands, moving the detent 121 against the upper stop 124. The ratchet wheel, being thus freed, is turned by the associated torsion spring 128 through a portion of a tens-transfer step until the ratchet wheel tooth, which was adjacent the detent 120, engages this detent which has been moved into the path of the tooth by the rocking of the pawl.

As the engagement of the lobe, or tooth, of a tens-transfer cam 49 with the associated tens-transfer lever 50 is very brief, the escapement pawl 110 is urged by its spring 127 back to its original or unrocked, position almost immediately after it has been rocked. However, as the detent 121 has now been moved upwardly, it will first engage the side of a ratchet wheel tooth as the detent 120 releases the tooth with which it is engaged, and will then project into the next interdental space of the ratchet wheel and be moved by the succeeding ratchet wheel tooth down against the stop 125, at which point it will positively stop the ratchet wheel. Between the time the ratchet wheel is released and stopped, as explained above, it will advance one-tenth of a rotation or one complete tens-transfer step.

A spur gear 130 (Figs. 1, 6 and 8) is rigidly mounted on each stub shaft 117, at the rear side of the rear frame plate 11, each ratchet wheel 118 being drivingly connected to the associated spur gear 130 by the stub shaft 117. A spur gear 131 (Figs. 1 and 5) is mounted on the rear end of each core shaft 106, at the rear side of the rear transverse frame member 11. The spur gear 131 meshes with the corresponding gear 130, so that the corresponding core shaft 106 will be turned through a predetermined part of a rotation when the ratchet wheel 118 drivingly connected thereto is advanced one-tenth of a rotation, as described above.

The bevel gear 105 of each differential unit 100 is normally held rigidly against rotation by the locking action of the ratchet wheel pawl 110 on the associated ratchet wheel escapement 118 and the driving connection between the ratchet wheel and the corresponding core shaft 106. However, when the core shaft is rotationally advanced, as described above, the gear 105 is also rotationally advanced, turning the cage 101 to add one-tenth of a rotation to the corresponding extension shaft 88 in addition to the angular increments of rotation imparted to this shaft by the aligned square shaft 52.

From the above description, it is apparent that a tens-transfer can be accomplished at any time during the digitation operation of the mechanism and that it is not necessary to wait until the values from the keyboard have been entered into the register before making the tens-transfers, as is now the case. With such an arrangement, the entry and tens-transfer can be completed, if desired, in a small part of a machine cycle, leaving the remainder of the cycle free for other operations, such as carriage shifting, overdraft correction or interregister transfer.

Drive shaft units, or assemblies, as generally indicated at 135 (Fig. 1), are disposed below, and axially parallel to, the square shafts 52, there being preferably one-half as many drive shaft units as square shafts, i.e., each drive shaft being disposed between two adjacent square shafts, as shown in Fig. 3. Each drive shaft unit 135 is formed in two parts 136 and 137 disposed in end-to-end and coaxial relationship, with the front and rear ends of the part 136 being journalled in the transverse frame plates 10 and 12, respectively, and the front and rear ends of the part 137 being journalled, respectively, in the frame plates 12 and 13. Each pair of drive shaft parts 136 and 137 carries a series of spur gears spaced apart therealong and designated at 141 to 149, inclusive, with the gears 141 to 144 on the drive shaft part 136 progressing in diameter in the order indicated and the gears 145 to 149 on the drive shaft part 137 also progressing in diameter in the order indicated, but not necessarily following the progression ratio of the gears 141 to 144, inclusive.

A lay shaft 150 is disposed below, and preferably parallel to, each drive shaft unit 135 and is journalled at its front and rear ends in the transverse frame members 10 and 13, respectively, and intermediate its length in the transverse frame member 12. A gear 151 on the rear portion of the drive shaft part 137 meshes with a larger gear 152 on the lay shaft 150. A gear 153 on the lay shaft, near the front transverse frame plate 10, meshes with a gear 154 on the drive shaft part 136, the gear 154 preferably being larger than the gear 153, so that the lay shaft 150 and the corresponding gear trains provide a speed-reducing drive from the drive shaft part 137 to the drive shaft part 136. With this arrangement, the drive shaft part 136 will be turned at a slower speed than the part 137, permitting the diameters of the gears of the several proportional gear trains between the drive shaft units 135 and the square shafts 52 to be kept within practical manufacturing limits.

The gears 141 to 149, inclusive, on the drive shafts are wider than the gears 53 to 61, inclusive, on the square shafts 52, and the arrangement is such that gears on two adjacent square shafts mesh with the same gear on a common drive shaft unit so that each drive shaft is effective to drive two square shafts. The intermeshing gears 141 and 53, 142 and 54, 149 and 61, inclusive, provide a series of proportional gear trains of such ratio that a single rotation of drive shaft 156 will drive the square shaft 52 through an angular increment corresponding to the value of the digital value key 16 depressed. That is, when a clutch 62 is engaged, the proportional gear train including a gear 53 and a gear 141 will drive the corresponding square shaft 52 and extension shaft 88 one-tenth of a rotation for a complete rotation of the corresponding drive shaft 156. The train including intermeshing gears 54 and 142 will, upon engagement of clutch 63, drive the associated square shaft two-tenths of a rotation in every cycle. The gear trains progress in ratio up to the final gear train, including a gear 61 and a meshing gear 149, which gear train will drive the square shaft 52 and associated extension shaft 88 nine-tenths of a rotation for one rotation of the corresponding drive shaft 156.

With this arrangement, when a digit key 16 is depressed, and an additive or subtractive cycle of the machine subsequently established, the square shaft assembly 52 and 88, corresponding to the key row in which the depressed key is located, will be rotated a number of tenths of a rotation corresponding to the digit number of the depressed key and will rotate the associated dial assembly 42 through the same number of tenths of a rotation from one to nine-tenths. Thus, an entry value selected on the keyboard of the machine is transmitted directly into the machine register with a unidirectional rotation of the digitation mechanism and, where values are accumulated in the register, tens-transfers are automatically accomplished at the same time that the digitation is taking place.

A bevel gear 155 is secured on the rear end of each drive shaft part 137 at the forward side of the transverse frame member 13. A main drive shaft 156 extends along the rear side of the frame member 13 past the rear ends of the drive shaft parts 137 and carries a series of bevel gears 157 which mesh respectively with the bevel gears 155 and preferably have a one-to-one gear ratio so that all of the drive gear parts 137 are turned through a complete rotation for each complete rotation of the main drive shaft 156.

Figure 10:
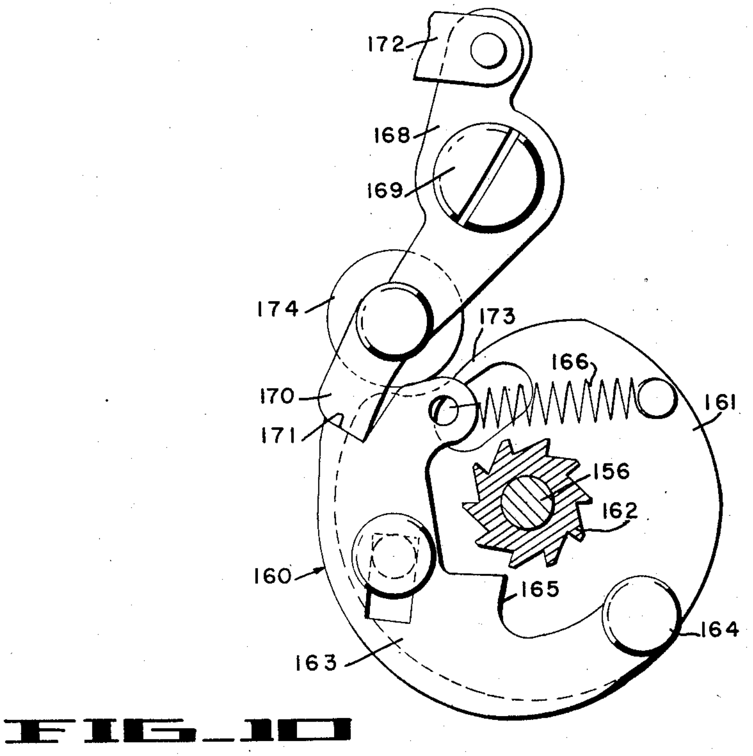
Fig. 10 is a cross-sectional view of the main drive shaft of the machine showing a conventional one-rotation clutch for driving this shaft.

A single cycle, or one rotation, clutch, as generally designated at 160 and illustrated in Fig. 10, is interposed between the power unit of the machine and main drive shaft 156. This clutch may be of well-known construction and, as illustrated, includes a cam disk 161 mounted on the shaft 156 for rotation with this shaft, and a ratchet wheel 162 journalled on the shaft 156 and drivingly connected to an element, such as a spur gear, driven from the power unit of the machine, to effect rotation of shaft 156. A clutch pawl 163 is pivotally mounted at one end on the disk 161 by a pivotal connection 164 and has, intermediate its length, a tooth 165 which is urged into engagement with the ratchet wheel 162 by a spring 166 connected between the free end of the pawl 163 and the disk 161. A clutch control arm 168 is pivotally mounted at 169 on the machine frame and has a portion depending from the pivotal mounting 169 and terminating at one end in a stop, or block, formation 170, which engages with a shoulder 171 on the clutch pawl 163 to disengage the pawl from the ratchet wheel 162 when the shaft 156 has been driven for one complete rotation. A link 172 is connected to the other end of the control arm 168 and is effective to release the control arm from the clutch pawl shoulder 171 when a control key of the machine is depressed, to thereby establish an operating cycle of the machine, in a manner well known to the art.

The cam disk 161 is provided with a single depression 173 which registers with a roller 174 on the control arm 168 when the clutch is in its full-cycle position. During operation, the roller rides on the edge of the cam disk 161 to maintain the control arm 168 out of engagement with the shoulder of the pawl 163 until the rotational cycle of the shaft 156 is completed. At the termination of a complete rotation of the shaft 156, the roller 174 drops into the depression 173 of the cam disk 161, engaging the block formation 170 with the pawl shoulder 171 at the end of the cyclic rotation of shaft 156 to thereby stop the shaft. This movement of the control arm 168 releases the depressed control key and also actuates mechanism well known to the art, to rock the bail 35 and thereby release all of the latched-down keyboard keys 16. Thus, the main drive shaft 156 will be turned through one complete rotation and stopped at the same angular position each time a digitation cycle of the machine is established by depression of an addition or subtraction control key.

The invention may be embodied in other specific forms without departing from the spirit or essential characteristics thereof. The present embodiment, is therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a calculating machine, a frame, a keyboard mounted on said frame and including a keyboard frame and rows of keys having stems extending slidably through said keyboard frame, a register mounted on said machine frame in spaced relationship to said keyboard and including a register frame and dial shafts journalled in said register frame, square shafts journalled in said machine frame below said keyboard and disposed one below each key row, gears journalled on each square shaft and disposed one adjacent each key stem of the corresponding key row, clutches carried by said square shafts one adjacent each of said gears and operable by the corresponding key stems to drivingly connect the associated gears to the corresponding square shafts, drive shafts journalled in said machine frame below and parallel to said square shafts, gears fixed on said drive shafts and meshing respectively with corresponding gears on said square shafts, power means including a single rotation clutch drivingly connected to said drive shafts, the ratio of said drive shaft and square shaft gears being such that said square shafts are driven from one-tenth to nine-tenths of a rotation for each rotation of said power means depending on which of the key-operated clutches on a particular square shaft is engaged, extension shafts journalled in said frame in spaced-apart and parallel relationship to each other and disposed one adjacent each of said dial shafts and coaxially of corresponding square shafts, means providing a manually controllable and reversible driving connection between each extension shaft and the corresponding dial shaft, a differential mechanism interposed between each extension shaft and the corresponding square shaft, tens-transfer means actuated by said dial shafts, and means extending through said extension shafts and connecting said tens-transfer means to said differential mechanisms in a manner such that the operation of a tens-transfer means advances the extension shaft of the next higher order one-tenth of a rotation.

2. In a calculating machine having a keyboard containing ordinally arranged rows of keys, an ordinally arranged register, digitation mechanism conditioned by said keyboard and drivingly connectable with said register to enter keyboard selected values into said register, and power means for operating said digitation mechanism, the arrangement wherein said digitation mechanism comprises a set of ordinally spaced and substantially parallel register shafts, a set of drive shafts connected to said power means and arranged substantially parallel to said register shafts, constantly intermeshing proportional gear trains including gears on said drive shafts and gears on said register shafts, key-operated means effective to selectively provide driving connections between one set of shafts and the gears thereon, the gears on the other set of shafts being fixed thereon, means for severally locking each register shaft against rotation, and means operated by the keys for disabling the locking means for the coordinal register shaft.

3. In a calculating machine having a keyboard containing ordinally arranged rows of keys, a register, digitation mechanism conditioned by the keys of said keyboard and drivingly connectable with said register to enter keyboard selected values into said register, and power means for operating said digitation mechanism, the arrangement wherein said digitation mechanism comprises a set of ordinally spaced and substantially parallel register shafts, a set of drive shafts connected to said power means and arranged substantially parallel to said register shafts, constantly intermeshing proportional gear trains including gears on said drive shafts and gears on said register shafts, and clutches operated directly by said keys and effective to selectively provide driving connections between one set of shafts and the gears thereon, the gears on the other set of shafts being fixed thereon.

4. In a calculating machine having a keyboard containing ordinally arranged rows of keys, a register, and power means, digitation mechanism driven by said power means and comprising a first set of drive shafts parallel to said rows of keys and serving the keys of one end of said rows, a second set of drive shafts coaxially arranged with the first set of drive shafts, means connected to said power means for driving said sets of drive shafts at different speeds, a set of ordinally arranged counter shafts extending along said drive shafts in parallel relationship thereto, intermeshing proportional gear trains including gears on said drive shafts and gears on said counter shafts, and key-operated clutches effective to selectively provide driving connections between the shafts of one set of shafts and the gears thereon, the gears on the other set of shafts being drivingly connected thereto.

5. In a calculating machine having a keyboard containing ordinally arranged rows of keys, a register having ordinally arranged register assemblies, and power means, digitation mechanism comprising a set of ordinally arranged and substantially parallel register driving shafts, a set of parallel and spaced-apart power-driven shafts extending along said register driving shafts, intermeshing proportional gear trains including gears on said register driving shafts and gears on said power-driven shafts, key-operated clutches effective to selectively provide driving connections between one set of shafts and the gears thereon, the gears on the other set of shafts being drivingly connected thereto, a differential gear train interposed between each register driving shaft and its coordinal register assembly, said differential gear trains each including a gear normally locked against rotation, and tens-transfer means conditioned by said register assemblies and driven by power loaded spring means in a manner to advance the locked gear of the adjacent higher order differential gear train through tens-transferring rotational increments while said digitation mechanism is operating to enter a keyboard selected value in said register.

6. In a calculating machine including a keyboard having ordinally arranged rows of digit keys progressing from "1" to "9" in each row, a register having rotatable dial assemblies ordinally arranged, and a cyclically operable power means; digitation mechanism comprising a set of drive shafts parallel to said rows of keys driven by said power means, a set of ordinally arranged digitation shafts disposed substantially parallel to said drive shafts, series of intermeshing proportional gear trains arranged along said shafts and progressively proportioned to rotate said digitation shafts from one to nine increments of a rotation for each cycle of operation of said power means, each of said proportional gear trains including a gear journalled on a digitation shaft and a gear mounted on the corresponding power-driven shaft and drivenly connected thereto, key-operated clutches carried by said digitation shafts and effective to selectively drivingly connect the dial assembly driving shaft carried gears to the corresponding shafts, a set of ordinally arranged dial assembly driving shafts, means for reversibly connecting said dial assemblies to said dial assembly driving shafts, a differential gear train for connecting each digitation shaft to its coordinal dial assembly driving shaft, and a tens-transfer mechanism operated by each lower order dial assembly passing through its transfer position for imparting additional rotation to the differential gear train of the adjacent higher order.

7. In a calculating machine having a keyboard including ordinally arranged rows of movable digit keys, a register including rotatable dial assemblies ordinally arranged and each having tens-transfer actuating means, a main drive shaft, and power means effective to impart successive single rotation cycles of operation of said main drive shaft, digitation mechanism comprising a first set of ordinally arranged shafts disposed one shaft along each key row of said keyboard, a second set of shafts respectively disposed in longitudinal alignment with the shafts of said first set and severally effective to impart increments of rotational movement to the dial assemblies of the corresponding orders, a third set of shafts driven from said main drive shafts, proportional gear trains effective to provide driving connections of varying ratios between the shafts of said third set and the shafts of said first set of shafts, key-operated means effective to selectively enable said gear trains to impart to the shafts of said first set corresponding to the several key rows rotational increments of from one to nine unit spaces of rotation upon a single rotation of the shafts of said third set, differential devices connecting the aligned shafts of said first and second sets, shaft means connected to said differential mechanisms normally holding one side of each differential mechanism stationary, means biased by power-loaded springs to turn said shaft means in a direction to advance said differential units, and escapement means connected with said shaft means and each actuated by the dial assembly tens-transfer means of one order to free the shaft means of the next higher order for a single step advancement of the corresponding differential unit by the associated spring biased means.

8. In a calculating machine having a register including rotatable dial assemblies ordinally arranged and having tens-transfer actuating means enabled when the corresponding dial assembly passes through its "0" to "9" position, ordinally arranged digitation shafts, extension shafts respectively disposed in longitudinal alignment with said digitation shafts and differential units connecting said digitation shafts to the coordinal extension shafts and effective to transfer rotational movements of said digitation shafts to said dial assemblies, a tens-transfer mechanism comprising, a holding shaft extending along each extension shaft and connected to the adjacent side of the corresponding differential unit, a stub shaft for each holding shaft, power-loaded spring means constantly urging each stub shaft to rotate in a predetermined direction, a driving connection between each stub shaft and the corresponding holding shaft, a ratchet wheel on each stub shaft, and a rockable ratchet pawl disposed adjacent each ratchet wheel and effective when rocked by the tens-transfer means of the dial assembly of the next lower order to provide a one unit space escapement of the associated ratchet wheel and a consequent rotational advance of that side of the differential unit of the same order connected to the corresponding holding shaft.

9. In a calculating machine having a register including rotatable dial assemblies ordinally arranged and each provided with a tens-transfer cam, and digitation mechanism including rotatable square shafts ordinally arranged and key controlled in their rotational movements, tubular extension shafts extending longitudinally one from each square shaft and past the dial assemblies, means on each extension shaft effective to alternatively rotate the adjacent dial assembly in either rotational direction, a differential unit connected between each square shaft and the corresponding extension shaft and each including a cage connected to the extension shaft, a first bevel gear connected to the square shaft, a second bevel gear spaced from and opposed to said first bevel gear, and cage-carried spider gears meshing with said first and second bevel gears, a core shaft extending through each tubular extension shaft and drivingly connected to the corresponding second bevel gear, a stub shaft disposed adjacent each core shaft, a gear train connecting each stub shaft to the corresponding core shaft, spring means urging each stub shaft to rotate and rotate the corresponding core shaft in a direction to rotationally advance the associated differential mechanism and extension shaft, power-operated means frictionally connected to said spring means to maintain the latter under torsional load, escapement mechanism connected to each stub shaft and normally holding the associated stub shaft and corresponding core shaft against rotational movement, and means actuated by the tens-transfer cam of the corresponding dial assemblies to release the escapement mechanisms for one step rotational movements of the corresponding stub shafts and extension shafts by the associated spring means.

10. In a calculating machine having a keyboard including manually movable digit keys disposed in ordinally arranged rows with the keys in each row numbered from "1" to "9," a register including ordinally arranged and rotatable dial assemblies, and power means including a one rotation clutch, digitation mechanism including ordinally arranged and rotatable square shafts severally effective to rotate said dial assemblies, rotatable drive shafts disposed adjacent said square shafts and driven by said power means through single rotation operating cycles, normally disabled proportional gear trains interposed between said drive shafts and said square shafts with the gear trains associated with each square shaft effective to rotationally advance the associated square shaft from one to nine rotational steps for a single complete rotation of the corresponding drive shaft, key-operated means effective to selectively enable said gear trains, releasable means positively holding each of said square shafts against rotational movement, and key-operated means effective to release each square shaft for rotation upon a predetermined manual movement of a digit key in the corresponding key row.

11. In a calculating machine having a keyboard including manually movable digit keys disposed in ordinally arranged rows with the keys in each row numbered from "1" to "9," a register including ordinally arranged and rotatable dial assemblies, and power means including a one rotation clutch, digitation mechanism including ordinally arranged and rotatable square shafts severally effective to rotate said dial assemblies, rotatable drive shafts disposed adjacent said square shafts and driven by said power means through single rotation operating cycles, normally disabled proportional gear trains interposed between said drive shafts and said square shafts with the gear trains associated with each square shaft effective to rotationally advance the associated square shaft from one to nine rotational steps for a single complete rotation of the corresponding drive shaft, key operated means effective to selectively enable said gear trains, releasable means positively holding each of said square shafts against rotational movement, each of said drive shafts comprising two parts disposed in end-to-end alignment with one part driven directly by said power means, lay shafts extending along said drive shaft, and speed-reducing gear trains between the one part of each drive shaft and the corresponding lay shaft and between the lay shaft and the other part of the same drive shaft.

References Cited in the file of this patent

UNITED STATES PATENTS

| | | |
|---|---|---|
| 951,982 | Burkhardt | Mar. 15, 1910 |
| 1,011,156 | Chase | Dec. 12, 1911 |
| 1,096,238 | Graber | May 12, 1914 |
| 1,281,163 | Hopkins et al. | Oct. 8, 1918 |
| 1,482,372 | Bauerle | Jan. 29, 1924 |
| 2,020,975 | Turck | Nov. 12, 1935 |
| 2,239,460 | Levy | Apr. 22, 1941 |
| 2,378,472 | Dustin | June 19, 1945 |
| 2,378,560 | Kiel | June 19, 1945 |
| 2,383,731 | Mathi | Aug. 28, 1945 |
| 2,525,423 | Nolde | Oct. 10, 1950 |

FOREIGN PATENTS

| | | |
|---|---|---|
| 382,738 | France | Dec. 16, 1907 |
| 742,464 | Germany | Apr. 25, 1944 |
| 217,539 | Switzerland | June 16, 1942 |